(12) United States Patent
Kanzaki

(10) Patent No.: US 11,149,862 B2
(45) Date of Patent: Oct. 19, 2021

(54) VALVE DEVICE AND COOLING SYSTEM

(71) Applicant: DENSO CORPORATION, Kariya (JP)

(72) Inventor: Shogo Kanzaki, Kariya (JP)

(73) Assignee: DENSO CORPORATION, Kariya (JP)

(*) Notice: Subject to any disclaimer, the term of this patent is extended or adjusted under 35 U.S.C. 154(b) by 100 days.

(21) Appl. No.: 16/749,037

(22) Filed: Jan. 22, 2020

(65) Prior Publication Data

US 2020/0158248 A1    May 21, 2020

Related U.S. Application Data

(63) Continuation of application No. PCT/JP2018/027010, filed on Jul. 19, 2018.

(30) Foreign Application Priority Data

Jul. 24, 2017  (JP) ............................. JP2017-142808

(51) Int. Cl.
*F01P 11/14* (2006.01)
*F16K 11/04* (2006.01)
*F01P 3/00* (2006.01)

(52) U.S. Cl.
CPC .............. *F16K 11/04* (2013.01); *F01P 11/14* (2013.01); *F01P 2003/001* (2013.01)

(58) Field of Classification Search
CPC .......... F01P 2007/146; F01P 7/14; F01P 3/20; F01P 2050/24
See application file for complete search history.

(56) References Cited

U.S. PATENT DOCUMENTS

| 7,168,397 B2 | 1/2007 | Chanfreau et al. |
| 7,984,700 B2 | 7/2011 | Chanfreau et al. |
| 2014/0216375 A1* | 8/2014 | Miyazaki ............ F02D 13/0219 123/90.15 |
| 2016/0218602 A1 | 7/2016 | Fukushima et al. |

(Continued)

FOREIGN PATENT DOCUMENTS

| JP | 1-277617 | 11/1989 |
| JP | 2003-320854 | 11/2003 |

(Continued)

OTHER PUBLICATIONS

U.S. Appl. No. 16/710,353 to Ikemoto, titled "Valve Device", filed Dec. 11, 2019 (32 pages).

*Primary Examiner* — Long T Tran
(74) *Attorney, Agent, or Firm* — Nixon & Vanderhye P.C.

(57) ABSTRACT

A cooling-water control valve, which controls a flow rate of cooling water for an engine, includes a housing and a valve member. The housing has multiple outlet ports. The valve member is movably provided in the housing, so that it is rotatable around an axis line of the valve member. The valve member has multiple opened portions. Each of the opened portions is formed at a position, which is different from one another in an axial direction of the valve member. Each of the opened portions is operatively communicated to one of the outlet ports. The valve member changes a communication ratio between the opened portion and the outlet port depending on a rotational position of the valve member. The cooling-water control valve is provided at a position between the engine and an electric power converting device.

7 Claims, 15 Drawing Sheets

(56) References Cited

U.S. PATENT DOCUMENTS

2016/0376977 A1* 12/2016 Watanabe .............. F01P 7/167
                                                              123/41.08
2018/0119838 A1*  5/2018 Brazas ................. F16K 27/003
2018/0162377 A1*  6/2018 Colavincenzo ......... B60K 6/24

FOREIGN PATENT DOCUMENTS

| JP | 2004-92597 | 3/2004 |
| JP | 2011-202585 | 10/2011 |
| JP | 2016-196931 | 11/2016 |
| WO | 2018/230499 | 12/2018 |

* cited by examiner

US 11,149,862 B2

VALVE DEVICE AND COOLING SYSTEM

CROSS REFERENCE TO RELATED APPLICATION

This application is a continuation application of International Application No. PCT/JP2018/027010 filed on Jul. 19, 2018, which designated the US and claims the benefit of priority from Japanese Patent Application No. 2017-142808 filed on Jul. 24, 2017. The entire disclosures of all of the above applications are incorporated herein by reference.

TECHNICAL FIELD

The present disclosure relates to a valve device for controlling a flow rate of cooling medium for an internal combustion engine and relates to a cooling system having the valve device.

BACKGROUND

A valve device having a housing and a valve member is known in the art, according to which multiple ports of the housing are communicated to an inside of the housing depending on a rotational position of the valve member. The valve member has multiple opened portions and changes a communication area between each opened portion and each port depending on the rotational position. In a valve device according to one of the prior arts, fluid supply to a radiator and fluid supply to an electric power converting device (including an inverter) are controlled.

SUMMARY

It is an object of the present disclosure is to provide a valve device, which can be provided in an engine room without making a unit of an engine and its peripheral equipment larger. It is another object of the present disclosure to provide a cooling system having the valve device.

The valve device of the present disclosure, which controls a flow rate of cooling medium (cooling water) for the engine, includes a housing and a valve member. The housing has multiple ports. The valve member is rotatably provided in an inside of the housing, so that it is rotatable around its axis line. The valve member has multiple opened portions, which are formed at positions different from one another in an axial direction of the valve member, wherein each of the opened portions is operatively communicated to the respective port of the housing. The valve member changes a communication ratio between each of the opened portions of the valve member and each of the multiple ports of the housing depending on a rotational position thereof. The valve device is provided in an engine room at a position between the engine and an electric power converting device, which is used for an electric motor working as a vehicle driving source independently from the engine.

When the valve device is provided in the engine room as above, it is possible to effectively use a limited space between the engine and the electric power converting device. Therefore, it is possible to provide the valve device in the engine room without making a unit of the engine and its peripheral equipment larger.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
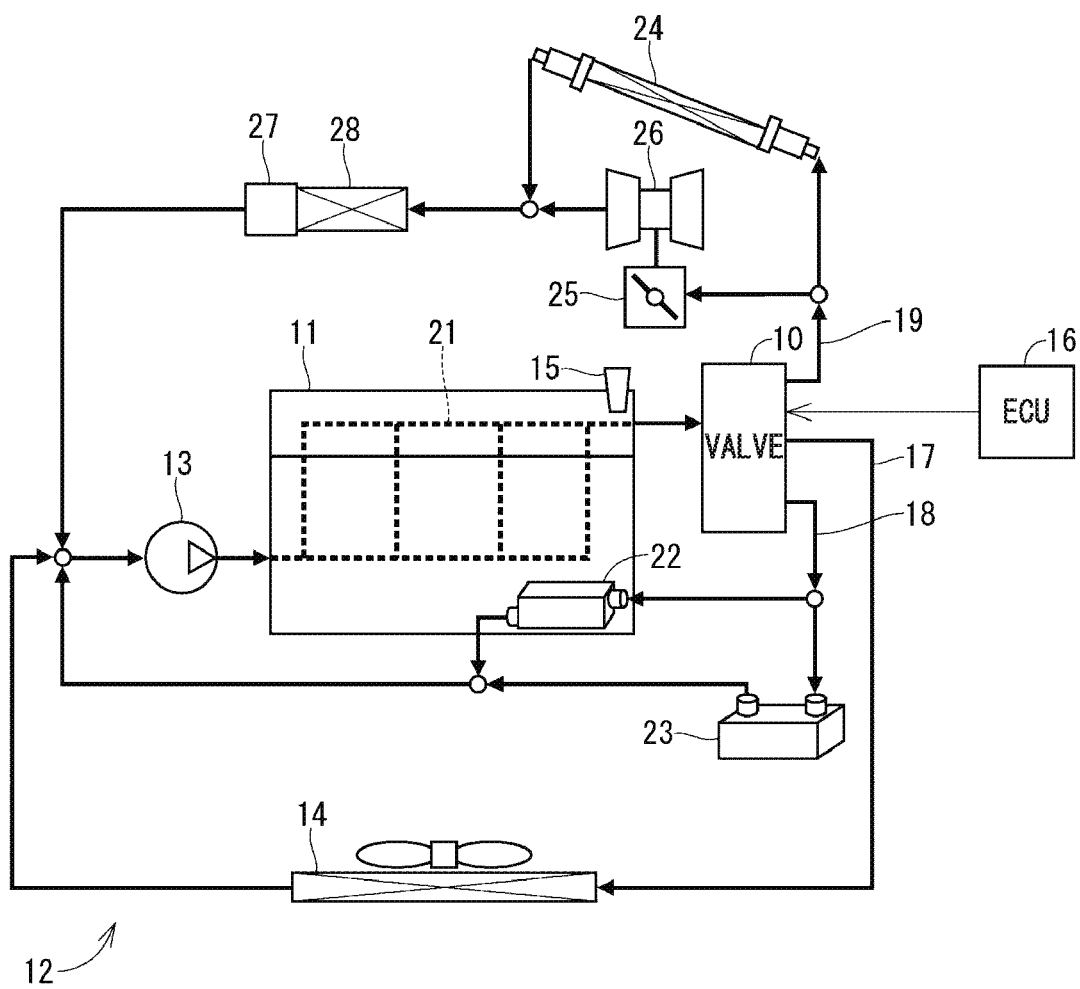
FIG. 1 is a schematic view for explaining a cooling system for an internal combustion engine, to which a cooling-water control valve according to a first embodiment is applied.

Multiple embodiments will be explained hereinafter with reference to the drawings. The same reference numerals are given to the same or similar structures and/or portions in each of the drawings in order to avoid repeated explanation.

First Embodiment

A cooling-water control valve 10 is shown in FIG. 1 as a valve device according to a first embodiment. The cooling-water control valve 10 is applied to a cooling system 12 for an internal combustion engine 11 (hereinafter, the engine 11) of a vehicle.

(Cooling System)

At first, the cooling system 12 will be explained. As shown in FIG. 1, the cooling system 12 includes the engine 11, a water pump 13, the cooling-water control valve 10, a radiator 14, a water temperature sensor 15, an electronic control unit (ECU) 16 and so on. The water pump 13 is provided at a position, at which multiple circulation passages 17, 18 and 19 get together. The water pump 13 pumps out cooling water working as cooling medium for the engine 11 to a water jacket 21 of the engine 11. The cooling-water control valve 10 is provided at a bifurcation point of the circulation passages 17, 18 and 19, for example, at an outlet portion of the water jacket 21. The cooling-water control valve 10 controls a flow rate of the cooling water flowing through each of the circulation passages 17, 18 and 19.

The radiator 14 is a heat exchanger provided in the circulation passage 17 for cooling down temperature of the cooling water through heat exchange between the cooling water and air. An engine oil cooler 22 and a transmission oil cooler 23 are provided in the circulation passage 18. A heater core 24, a throttle valve 25, a supercharger 26, an EGR (Exhaust Gas Recirculation) valve 27 and an EGR cooler 28 are provided in the circulation passage 19.

The water temperature sensor 15 is provided at an upstream side of the cooling-water control valve 10. The electronic control unit 16 operates the cooling-water control valve 10 depending on the temperature detected by the water temperature sensor 15 to control the flow rate of the cooling water in each of the circulation passages 17, 18 and 19.

(Cooling-Water Control Valve)

Figure 2:
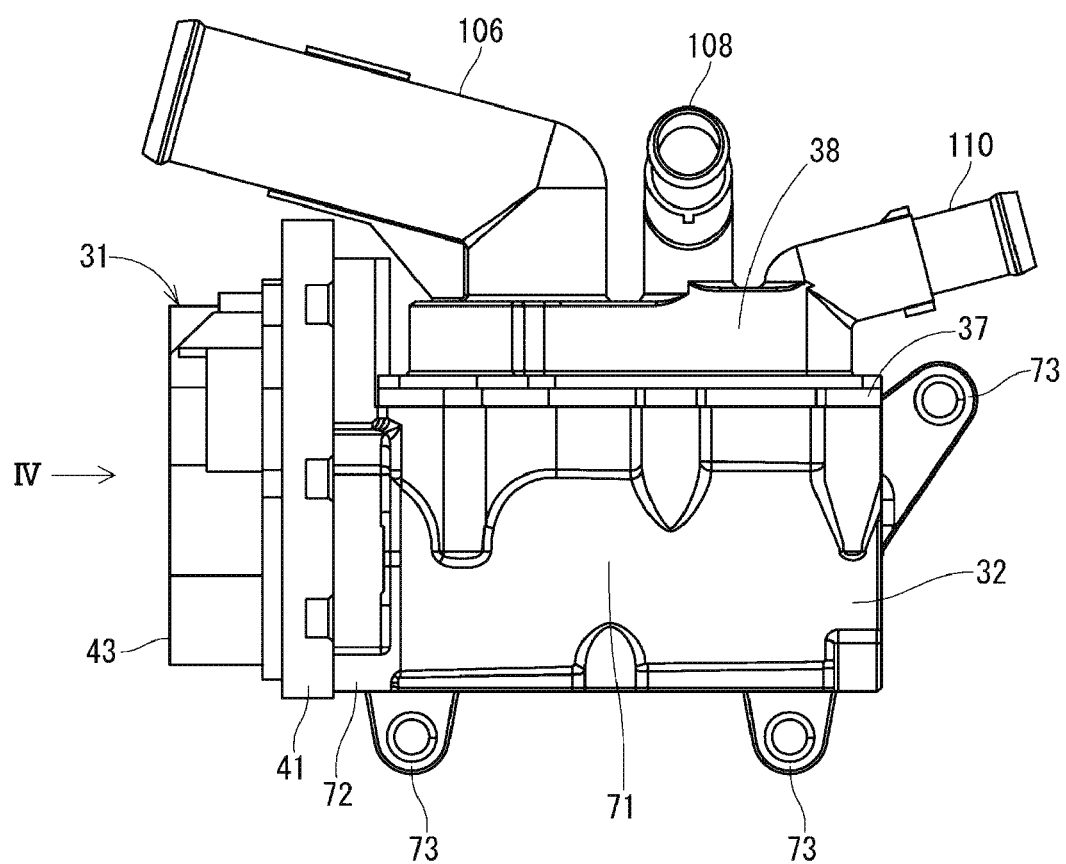
FIG. 2 is a schematic outline view showing the cooling-water control valve of FIG. 1.
Figure 3:
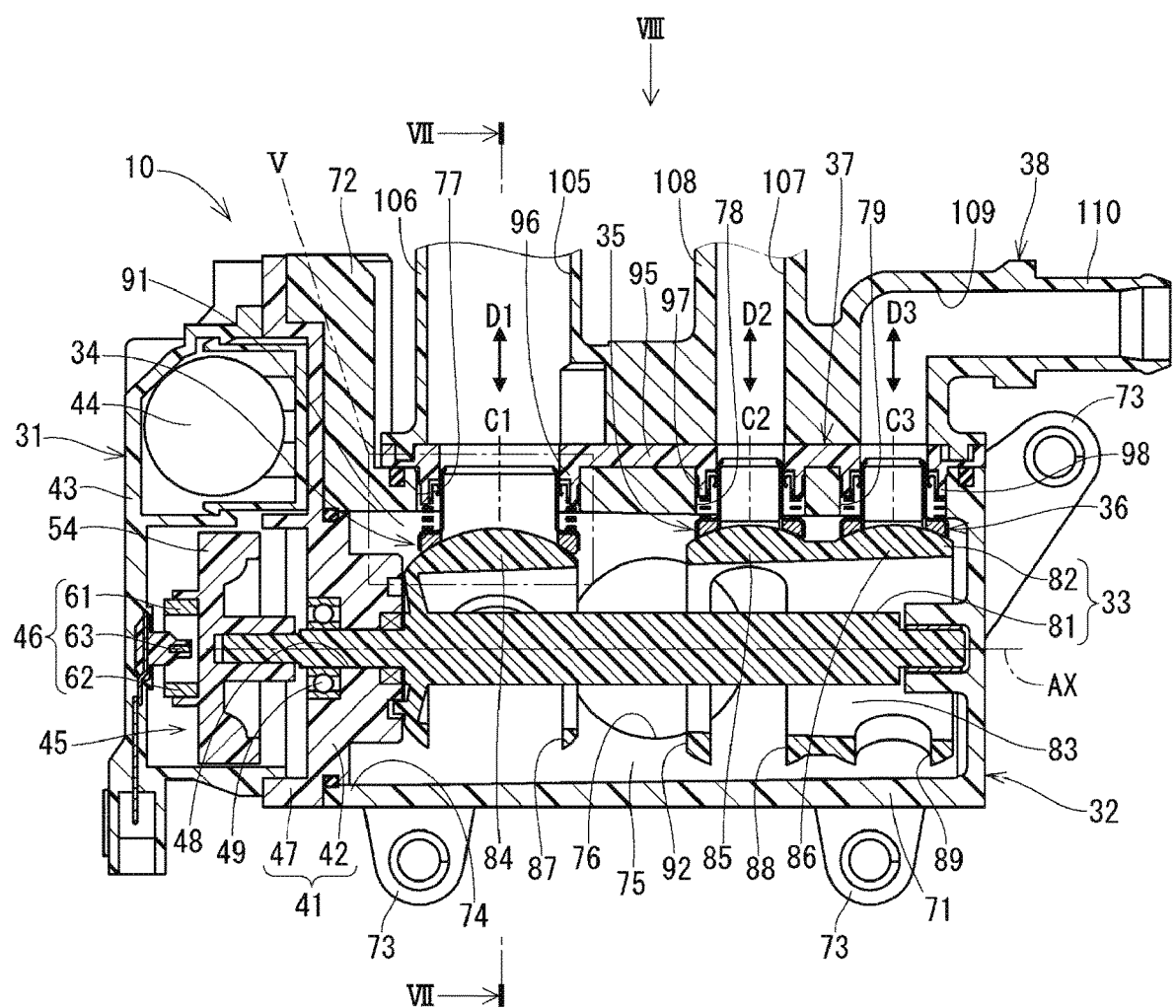
FIG. 3 is a schematic cross-sectional view taken along a plane passing through an axis line of a valve member for the cooling-water control valve of FIG. 2 and showing a condition that a communication ratio between each port of the housing and each opened portion of the valve member is 0%.

Now, the cooling-water control valve 10 will be explained. As shown in FIGS. 2 and 3, the cooling-water control valve 10 includes a driving portion 31, a housing 32, a valve member 33, sealing units 34, 35 and 36, a holding plate 37 and a pipe member 38.

Figure 4:
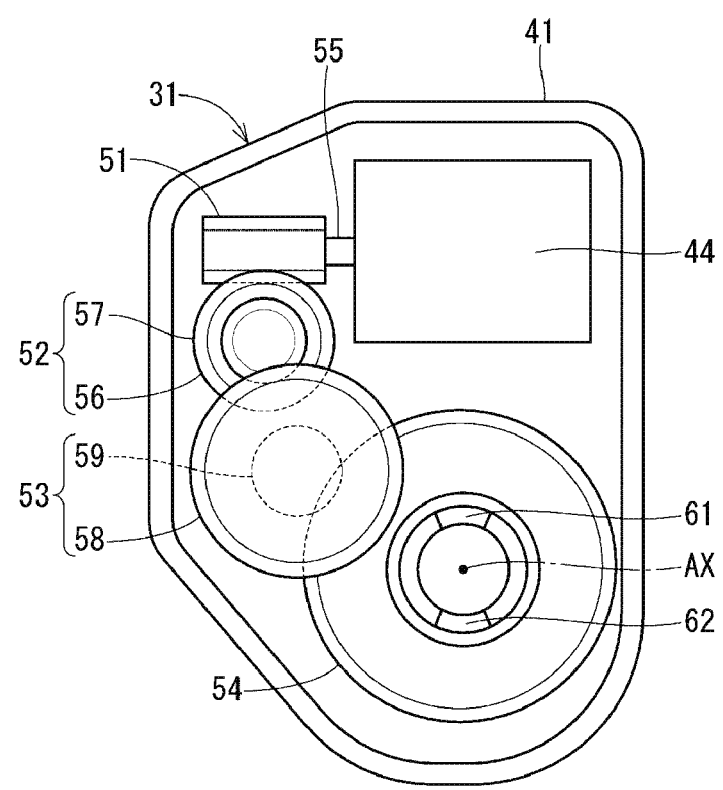
FIG. 4 is a schematic view showing the cooling-water control valve of FIG. 2 when viewed it in a direction of an arrow IV in FIG. 2, wherein a cover member is removed.

As shown in FIGS. 3 and 4, the driving portion 31 includes a casing member 41, a cover member 43 for forming a gear accommodation space together with the casing member 41, an electric motor 44 and a speed reduction device 45 both of which are accommodated in the gear accommodation space, and a rotational angle sensor 46.

The casing member 41 includes a base portion 47 of a plate shape and a fitting portion 42 fitted into an opening portion 74 of the housing 32. A shaft insertion hole 48 and a bearing 49 are provided at a center portion of the fitting portion 42. One end of a shaft portion 81 of the valve member 33 is inserted into the shaft insertion hole 48. The bearing 49 supports the one end of the shaft portion 81.

The speed reduction device 45 includes a cylindrical gear 51, a first gear 52, a second gear 53 and a third gear 54. The cylindrical gear 51 is connected to an output shaft 55 of the electric motor 44. The first gear 52 has a first large-diameter gear portion 56 to be engaged with the cylindrical gear 51 and a first small-diameter gear portion 57, a diameter of which is smaller than that of the first large-diameter gear portion 56. The second gear 53 has a second large-diameter gear portion 58 to be engaged with the first small-diameter gear portion 57 and a second small-diameter gear portion 59, a diameter of which is smaller than that of the second large-diameter gear portion 58. The third gear 54 is engaged with the second small-diameter gear portion 59 and connected to the one end of the shaft portion 81 of the valve member 33. The speed reduction device 45 reduces rotational speed of a driving power of the electric motor 44 and outputs the same to the valve member 33.

The rotational angle sensor 46 includes magnets 61 and 62 provided in the third gear 54 and a magnetic detecting portion 63 provided at a position between the magnets 61 and 62 and on an axis line AX of the valve member 33. The magnetic detecting portion 63 is composed of, for example, a hall IC (Integrated Circuit) or the like. The magnetic detecting portion 63 detects a rotational angle of the valve member 33 by detecting a magnetic field which is changed depending on a rotation of the valve member 33.

As shown in FIGS. 2 and 3, the housing 32 includes a cylindrical housing main body 71 having an inner space 75, mounting flanges 73 for mounting the cooling-water control valve 10 to the engine 11, and a fixing flange 72 for fixing the driving portion 31 to the cooling-water control valve 10. The opening portion 74 is formed at one end of the housing main body 71.

An inlet port 76 and multiple outlet ports 77, 78 and 79 are formed in the housing main body 71, each of which communicates the inner space 75 to an outside of the housing 32 (that is, an outside space of the housing 32). In the first embodiment, the inlet port 76 and the outlet ports 77, 78 and 79 are formed in side walls of the housing main body 71. In other words, each of the ports is so formed as to penetrate a cylindrical wall portion of the housing main body 71 in a radial direction thereof.

The valve member 33 is movably accommodated in the inner space 75 of the housing 32 so that it is rotatable around the axis line AX. The valve member 33 operatively communicates the inlet port 76 to the outlet ports 77, 78 and 79, or blocks off the communication between them, depending on its rotational position. The valve member 33 has the shaft portion 81 and a cylindrical portion 82 formed at an outer side of the shaft portion 81.

The shaft portion 81 is rotatably supported by the bearing 49 and an axial end portion of the housing main body 71. The cylindrical portion 82 is connected at its one axial end to the shaft portion 81. The shaft portion 81 and the cylindrical portion 82 are formed as one integral member. A valve inside passage 83 is formed between the shaft portion 81 and the cylindrical portion 82.

The cylindrical portion 82 of the valve member 33 has annular convex portions 84, 85 and 86, which are arranged in this order in an axial direction of the valve member 33. The annular convex portion 84 is formed at an axial position, which corresponds to a position of the outlet port 77. The annular convex portion 85 is formed at another axial position, which corresponds to a position of the outlet port 78, and the annular convex portion 85 is connected to the annular convex portion 84 by a connecting portion (not shown). The annular convex portion 86 is formed at a further different axial position, which corresponds to a position of the outlet port 79, and the annular convex portion 86 is connected to the annular convex portion 85. An outer surface of each annular convex portion 84, 85 and 86 is formed with a spherical surface.

The cylindrical portion 82 of the valve member 33 has opened portions 87, 88 and 89 for respectively communicating each of the outlet ports 77, 78 and 79 to the valve inside passage 83 depending on the rotational position of the valve member 33. The cylindrical portion 82 further has an opened portion 92 for communicating the valve inside passage 83 to the inlet port 76 via a part of the inner space 75 of the housing 32 (that is, the part of the inner space 75 at an outside of the valve member 33, which is hereinafter referred to as a valve outside passage 91), independently from the rotational position of the valve member 33. Each of the opened portions 87, 88 and 89 is formed at the axial positions different from one another in the axial direction and operatively communicated to each one of the outlet ports 77, 78 and 79. The opened portion 87 is formed in the annular convex portion 84 of the cylindrical portion 82 for operatively communicating the valve inside passage 83 to the outlet port 77. In a similar manner, the opened portion 88 is formed in the annular convex portion 85 for operatively communicating the valve inside passage 83 to the outlet port 78. The opened portion 89 is likewise formed in the annular convex portion 86 for operatively communicating the valve inside passage 83 to the outlet port 79. The opened portion 92 of the valve member 33 is formed between the annular convex portion 84 and the annular convex portion 85.

The holding plate 37 is a holding member for holding the sealing units 34, 35 and 36 and has a plate portion 95 and holding portions 96, 97 and 98. The plate portion 95 is formed in a plate shape and fixed to the housing main body 71. Each of the holding portions 96, 97 and 98 is an annular projection, which is respectively projected from the plate portion 95 into each of the outlet ports 77, 78 and 79.

Each of the sealing units 34, 35 and 36 is provided for each of the outlet ports 77, 78 and 79.

Figure 5:
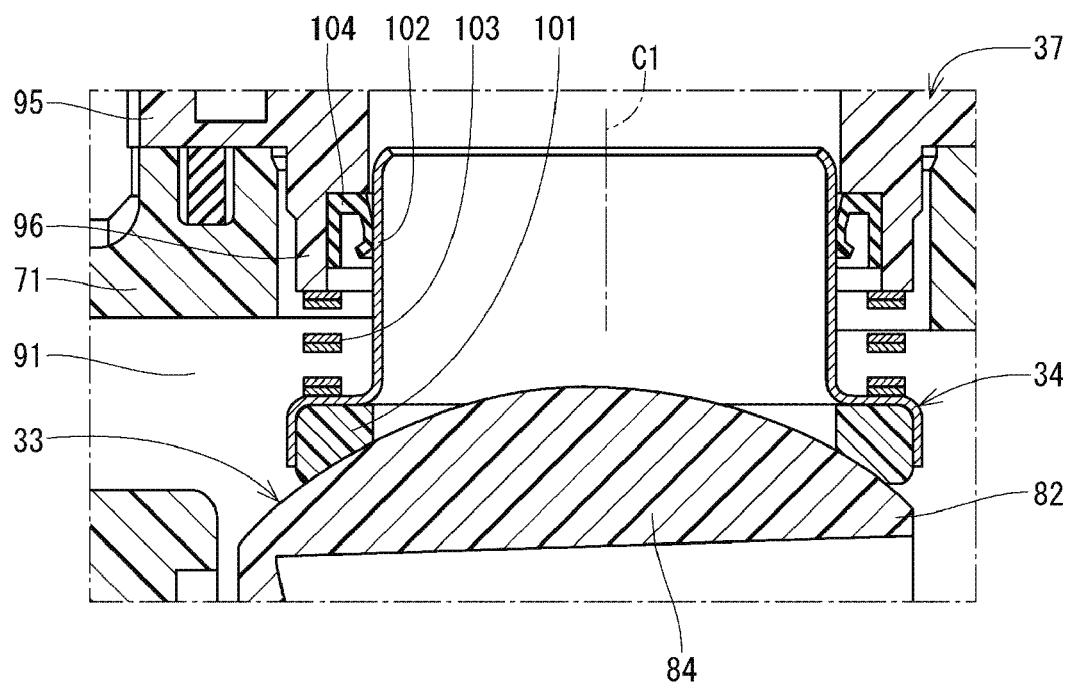
FIG. 5 is a schematically enlarged view of a portion V of FIG. 3.

As shown in FIGS. 3 and 5, the sealing unit 34 has a valve seal 101, a sleeve 102, a spring 103 and a sealing member 104. The valve seal 101 is an annular sealing member, which is in contact with the outer surface of the annular convex portion 84 of the valve member 33. The sleeve 102 is a cylindrical member provided in a direction from the outlet port 77 to the valve outside passage 91 and holding the valve seal 101. The spring 103 biases the sleeve 102 in a direction to the annular convex portion 84. The sealing member 104 seals an annular gap between the holding portion 96 of the holding plate 37 and the sleeve 102.

The sealing unit 34 seals a gap between the outlet port 77 and the valve outside passage 91. When the valve member 33 is rotated, a sealing condition is maintained by the sealing unit 34, wherein the annular convex portion 84 slides with respect to the valve seal 101.

In a similar manner to the sealing unit 34, the sealing unit 35 has a valve seal, a sleeve, a spring and a sealing member, in a similar manner to the sealing unit 34. The sealing unit 35 seals a gap between the outlet port 78 and the valve outside passage 91.

The sealing unit 36 has a valve seal, a sleeve, a spring and a sealing member, in the similar manner to the sealing unit 34. The sealing unit 36 seals a gap between the outlet port 79 and the valve outside passage 91.

As shown in FIGS. 2 and 3, the pipe member 38 includes a pipe portion 106 having a fluid passage 105 communicated to the outlet port 77, a pipe portion 108 having a fluid passage 107 communicated to the outlet port 78, and a pipe portion 110 having a fluid passage 109 communicated to the outlet port 79.

As shown in FIGS. 1 to 3. in the first embodiment, the inlet port 76 is connected to the outlet portion of the water jacket 21. The pipe portion 106 is connected to the circulation passage 17. The pipe portion 108 is connected to the circulation passage 18. The pipe portion 110 is connected to the circulation passage 19.

In the cooling-water control valve 10 having the above structure, the cooling water having passed through the water jacket 21 and having increased its temperature by absorbing heat from the engine 11 flows into the valve outside passage 91 through the inlet port 76. The cooling water flows from the valve outside passage 91 into the valve inside passage 83 through the opened portion 92 of the valve member 33. The cooling water in the valve inside passage 83 is distributed to each of the pipe portions 106, 108 and 110 depending on the communication ratio of each opened portion 87, 88 and 89 of the valve member 33 with respect to each of the outlet ports 77, 78 and 79.

Figure 6:
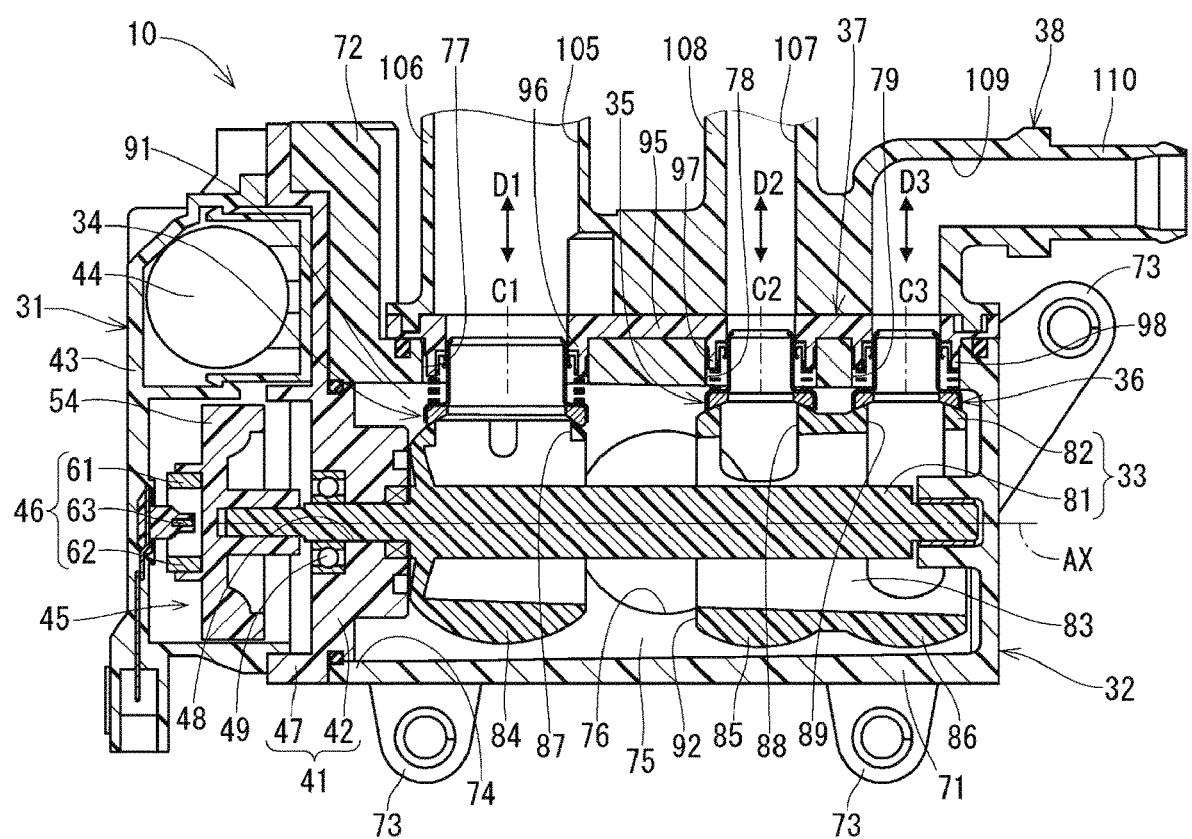
FIG. 6 is a schematic cross-sectional view taken along the plane passing through the axis line of the valve member for the cooling-water control valve of FIG. 2 and showing another condition that the communication ratio between each port of the housing and each opened portion of the valve member is 100%.

The communication ratio varies depending on the rotational position of the valve member 33. Namely, the valve member 33 changes the communication ratio between the opened portions 87, 88 and 89 and the outlet ports 77, 78 and 79 depending on the rotational position of the valve member 33. For example, in FIG. 3, each of the communication ratios between the opened portions 87, 88 and 89 and the outlet ports 77, 78 and 79 is 0% (zero percent). On the other hand, in FIG. 6, each of the communication ratios between the opened portions 87, 88 and 89 and the outlet ports 77, 78 and 79 is 100%. When the rotational position of the valve member 33 is changed from the position of FIG. 3 to the position of FIG. 6, each of the communication ratios between the opened portions 87, 88 and 89 and the outlet ports 77, 78 and 79 is changed from 0% to 100%. The flow rate of the cooling water flowing to each of the circulation passages 17, 18 and 19 is thereby adjusted.

(Respective Ports and Related Parts)

The respective ports and related parts of the cooling-water control valve 10 will be further explained.

Figure 7:
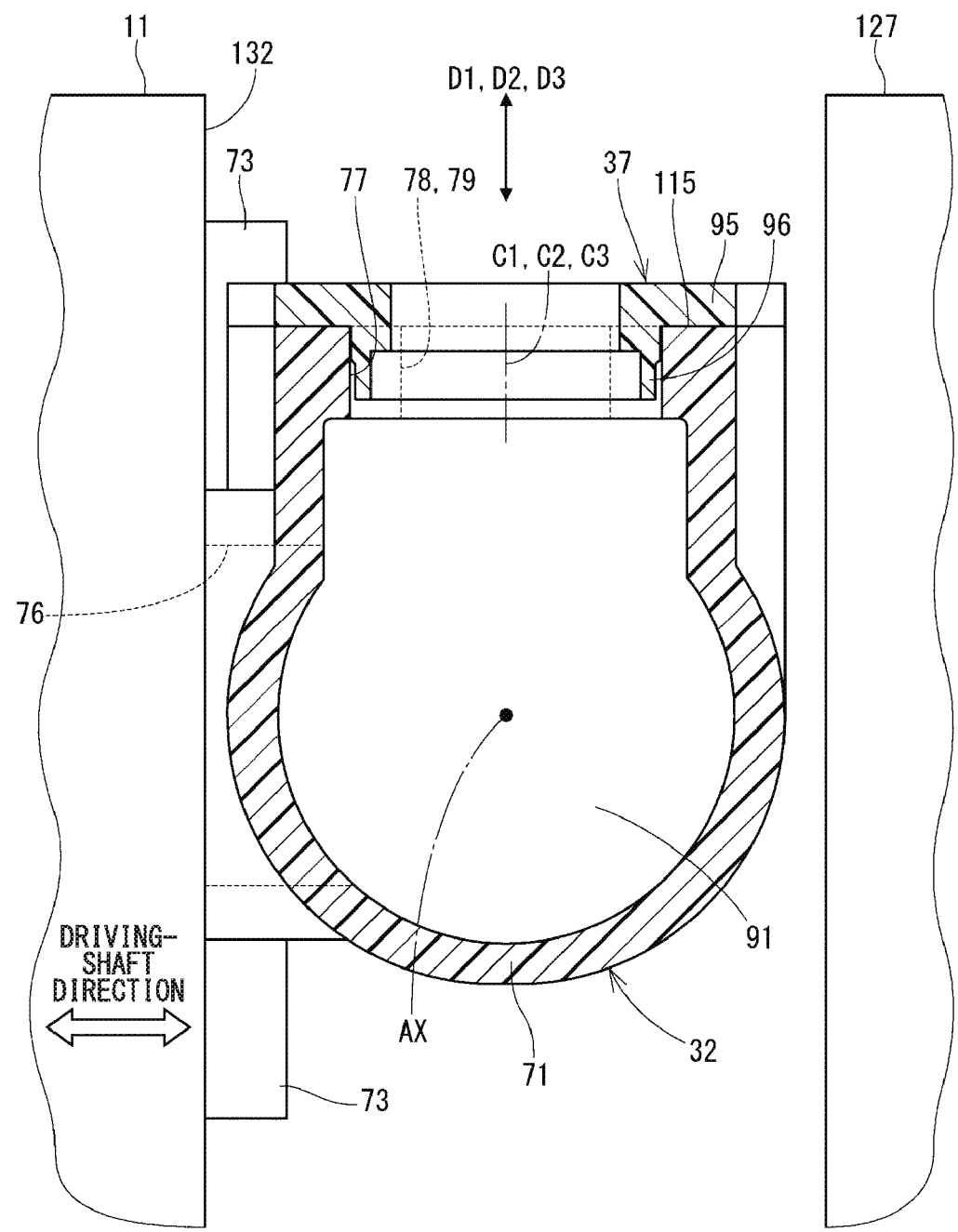
FIG. 7 is a schematic cross-sectional view taken along a line VII-VII in FIG. 3 and showing the housing and a holding plate.

As shown in FIG. 7, the inlet port 76 is formed in one of the side walls of the housing 32, which is mounted to the engine 11, that is, the side wall in which the mounting flanges 73 are formed, in such a manner that the inlet port 76 penetrates the side wall in the radial direction of the housing 32. The inlet port 76 is connected to the outlet portion of the water jacket 21 (FIG. 1), when the housing 32 is fixed to the engine 11. Therefore, it is not necessary to prepare a specific pipe member for connecting the inlet port 76 to the water jacket 21.

As shown in FIG. 7, at least a part of each outlet port 77, 78 and 79 overlaps with one another in a circumferential direction (that is, a direction equal to a rotational direction of the valve member 33), when viewed them in the axial direction (the direction parallel to the axis line AX). In other words, at least a part of one outlet port overlaps with all of the other outlet ports, when viewed them in the axial direction. When a case in which "one outlet port" is the outlet port 77 is taken as an example, at least the part of the outlet port 77 overlaps with the other outlet ports 78 and 79 in the circumferential direction, when viewed them in the axial direction. In other words, as shown in FIG. 3, all of the outlet ports 77, 78 and 70 appear in the cross section including the axis line AX.

Figure 8:
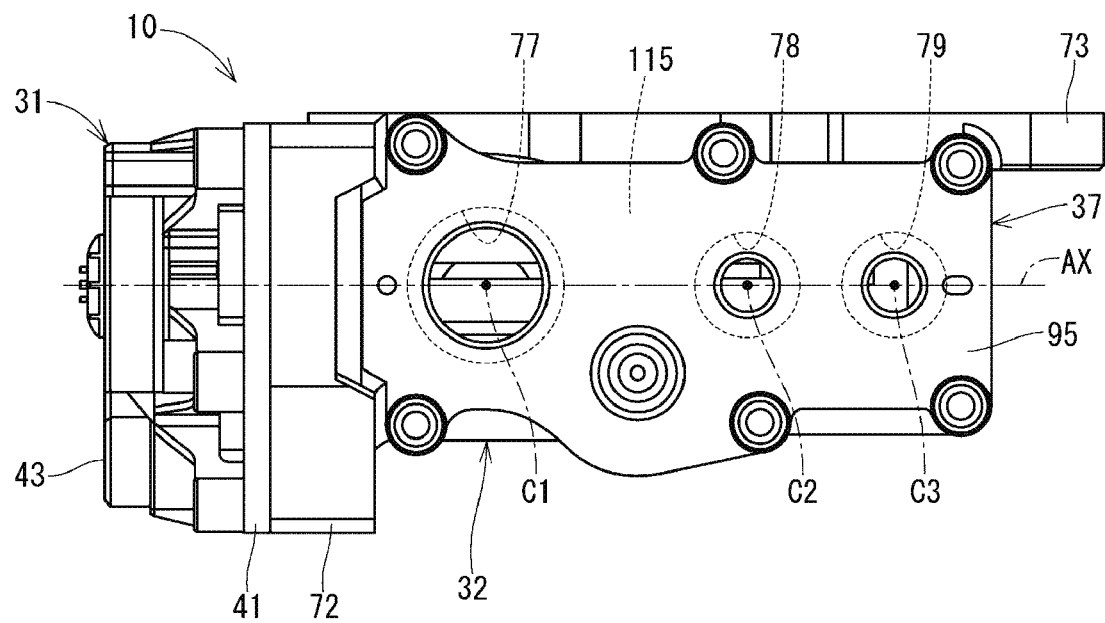
FIG. 8 is a schematic view showing the cooling-water control valve of FIG. 3 when viewed it in a direction of an arrow VIII in FIG. 3, wherein a pipe member is removed.

In the first embodiment, as shown in FIG. 7, each of circumferential positions of center axes C1, C2 and C3 of the outlet ports 77, 78 and 79 coincides with one another, when viewed them in the axial direction. In addition, as shown in FIGS. 7 and 8, each of the outlet ports 77, 78 and 79 is provided in an upper-side side wall 115 of the housing 32. Furthermore, as shown in FIG. 8, the outlet ports 77, 78 and 79 are arranged on a straight line of the axis line AX. According to the above structure, the outlet ports 77, 78 and 79 can concentrate in a predetermined portion (for example, on the straight line) of the housing 32 in the rotational direction of the valve member 33. Therefore, at least a base portion of each pipe portion 106, 108 and 110, which is respectively connected to each of the outlet ports 77, 78 and 79, can be made smaller than a width of the housing 32 (a width in a direction perpendicular to the axis line AX). It is, therefore, possible to make the cooling-water control valve 10 thinner.

As shown in FIGS. 3 and 7, each opening direction D1, D2 and D3 of the outlet ports 77, 78 and 79 (that is, a direction in which each center axis C1, C2 and C3 extends) is parallel to one another. The upper-side side wall 115 has a flat surface. Each of the opening directions D1, D2 and D3 is perpendicular to the upper-side side wall 115. According to the above structure, it is possible to assemble the sealing units 34, 35 and 36 as well as the pipe portions 106, 108 and 110 to the cooling-water control valve 10 without rotating the housing 32 around the axis line AX. In addition, since the sealing units 34, 35 and 36 can be assembled to the cooling-water control valve 10 in one direction, the assembling process becomes easier. Furthermore, all of the sealing units 34, 35 and 36 can be assembled at the same time.

As shown in FIG. 3, the holding plate 37 holds all of the sealing units 34, 35 and 36 together. When the sealing units 34, 35 and 36 and the holding plate 37 are sub-assembled to each other in advance and when such a sub-assembled unit is assembled to the housing 32, working efficiency for the assembling process can be further increased.

The holding plate 37, which holds the sealing units 34, 35 and 36, is made as an independent part from the pipe member 38. Therefore, even when the pipe member 38 is detached from the cooling-water control valve 10, a condition in which the sealing units 34, 35 and 36 are assembled to the housing 32 can be maintained. In addition, it is possible to unify the configuration of the cooling-water control valve of a condition that the pipe member is detached from the housing 32, between the cooling-water control valve of the present embodiment and another cooling-water control valve having a different pipe member from that of the present embodiment. Then, it becomes easier to check leakage for the sealing units 34, 35 and 36 of the cooling-water control valves having the different pipe members. For example, it becomes easier to automatize a leakage checking process.

In addition, in the pipe member 38 of the present embodiment, the pipe portions 106, 108 and 110 are integrally formed with one another. It is, therefore, possible to assemble the pipe portions 106, 108 and 110 in one assembling step. It is possible to increase the work efficiency for the assembling process.

(Layout of Components for Cooling System)

Components for the cooling system 12 will be further explained.

Figure 9:
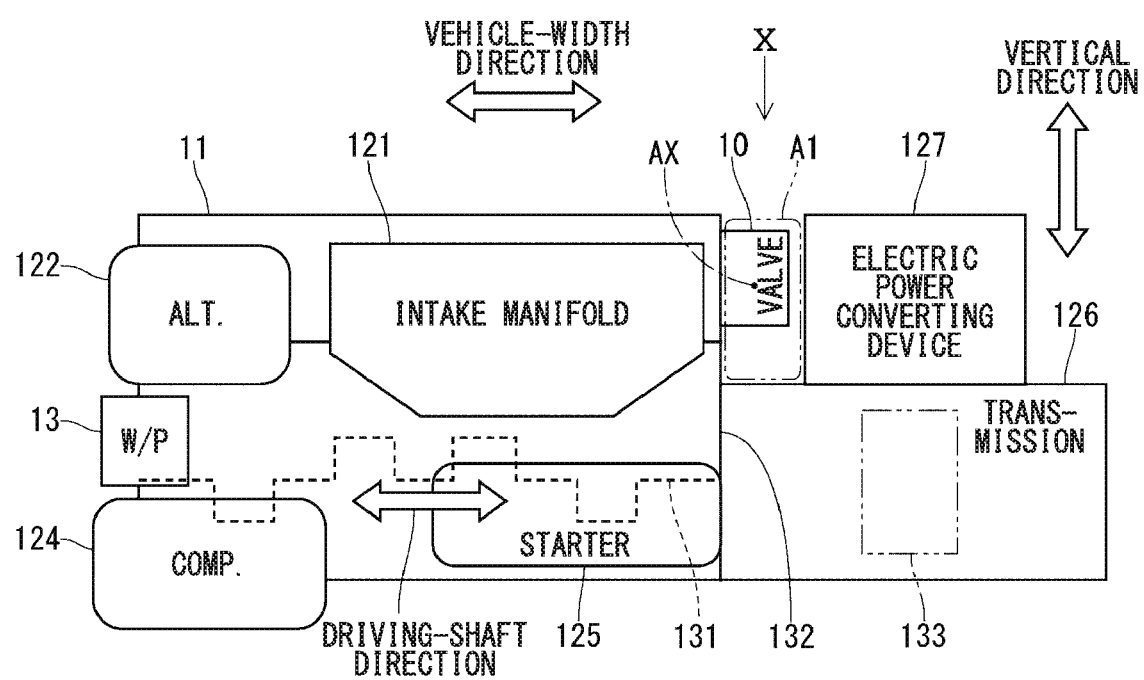
FIG. 9 is a schematic view showing an engine and its peripheral equipment of FIG. 1, when viewed them from a front side of a vehicle.

As shown in FIG. 9, the engine 11 is arranged in such a way that a direction of a crankshaft 131 which is a driving shaft of the engine 11 (hereinafter, a driving-shaft direction) is in parallel to a width direction of the vehicle (hereinafter, a vehicle-width direction). The engine 11 is a transversely-mounted engine (the transverse engine). An intake manifold 121, an alternator 122, the water pump 13, a compressor 124, a starter motor 125, a transmission apparatus 126 and so on are mounted to the engine 11.

The transmission apparatus 126 is mounted to a lower-side portion of a side wall 132 of the engine 11. An electric motor 133 is provided in the transmission apparatus 126. The electric motor 133 works as a driving power source for the vehicle in addition to the engine 11. An electric power converting device 127 is provided at a position above the transmission apparatus 126 in a vertical direction. The electric power converting device 127, which adjusts electric current to be supplied to the electric motor 133 from a battery (not shown), includes an inverter and so on. The electric power converting device 127 is arranged at a position, which is opposed to an upper-side portion of the side wall 132 of the engine 11 in the driving-shaft direction in a horizontal direction.

Figure 10:
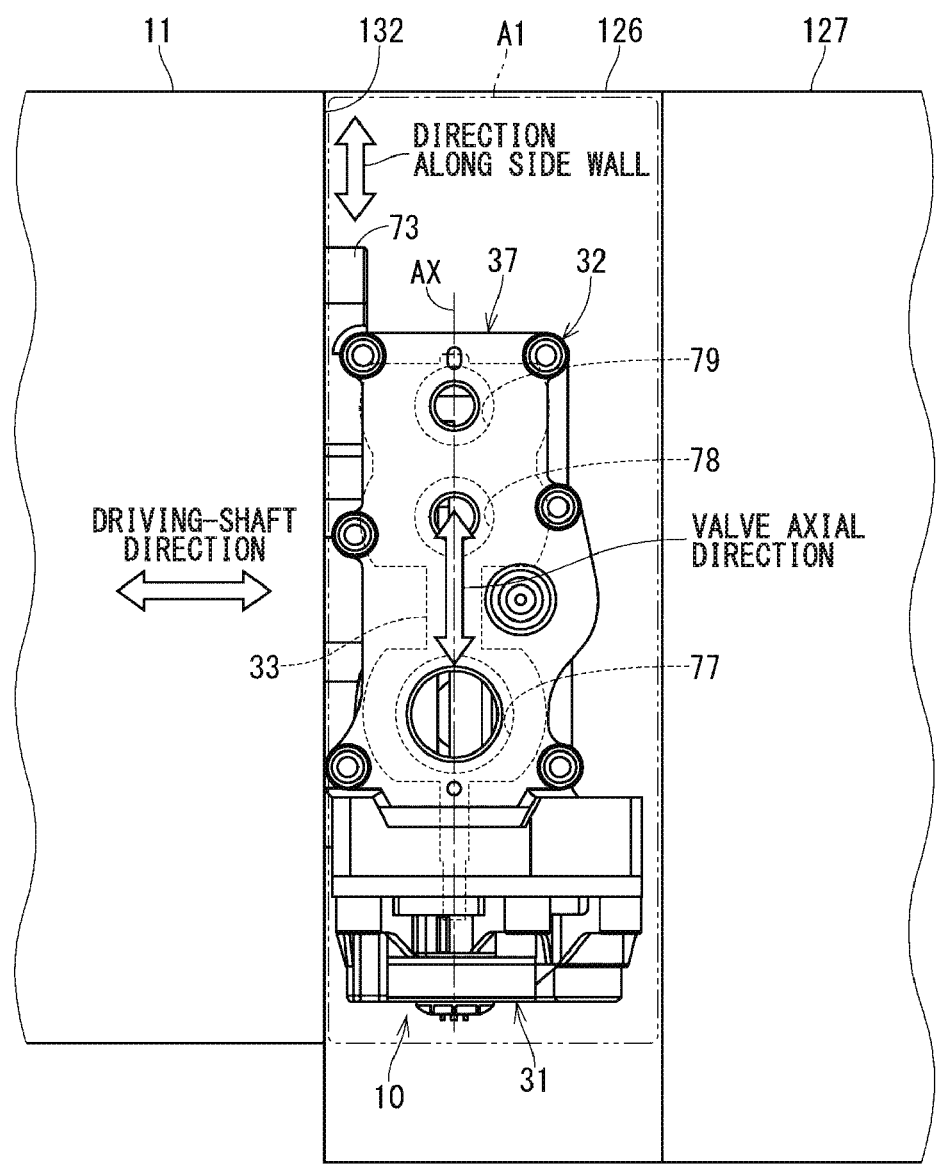
FIG. 10 is a schematic view showing the cooling-water control valve, the engine, an electric power converting device and a transmission apparatus, when viewed them in a direction of an arrow X in FIG. 9.

As shown in FIGS. 9 and 10, it is necessary to mount the engine 11 and so on in the engine room having a limited space. Since the electric power converting device 127 is arranged at the position relatively close to the engine 11, only a narrow space A1 is available between the engine 11 and the electric power converting device 127 in the driving-shaft direction.

The narrow space A1 is defined as a space, in which a distance between the engine 11 and the electric power converting device 127 in their opposing direction is smaller than a length of the engine 11 in the vertical direction along an opposing surface of the engine 11 (that is, the side wall 132). The length of the engine 11 in the vertical direction is equal to a height of the engine 11. The above opposing direction is equal to the horizontal direction in parallel to the vehicle-width direction. In the engine 11 of the transverse engine, the engine 11 is more likely to have restrictions in connection with the vehicle-width direction when compared with a longitudinally mounted engine. A space in the vehicle-width direction (the narrow space A1) is likely to become smaller.

The cooling-water control valve 10 is arranged in such a way that the axial direction of the valve member 33 (hereinafter, the valve axial direction) is substantially perpendicular to the driving-shaft direction in order that the cooling-water control valve 10 is surely arranged in the narrow space A1. The above term "substantially perpendicular" includes a condition that the valve axial direction intersects with the driving-shaft direction within an angle range between 80 and 100 degrees.

In addition, the housing 32 is formed in a cylindrical shape and its length in the radial direction (in the vehicle-width direction) is smaller than a length of the housing 32 in the axial direction. The cooling-water control valve 10 is arranged in such a way that the radial direction of the housing 32 coincides with the opposing direction between the engine 11 and the electric power converting device 127. In other words, the cooling-water control valve 10 is arranged in such a way that the axial direction of the housing 32 (that is, the valve axial direction) coincides with the vertical direction extending along the side wall 132 of the engine 11.

As shown in FIG. 7, the outlet ports 77, 78 and 79 concentrate in the predetermined portion of the housing 32 in its circumferential direction (that is, in the rotational direction of the valve member 33). The sealing units 34, 35 and 36, the holding plate 37 and the pipe member 38 are provided in the predetermined portion. A size of the housing 32 and the cooling-water control valve 10 in the radial direction, that is, in the opening direction D1, becomes relatively larger, while a size thereof in the radial direction perpendicular to the opening direction D1 becomes relatively smaller. The cooling-water control valve 10 is arranged in such a way that the radial direction of the cooling-water control valve 10 perpendicular to the opening direction D1 coincides with the opposing direction between the engine 11 and the electric power converting device 127.

As shown in FIG. 10, the cooling-water control valve 10 is further arranged in such a way that it overlaps with a part of the transmission apparatus 126, when viewed them in the vertical direction. In other words, the cooling-water control valve 10 is arranged in such a way that a projection of the cooling-water control valve 10 in the vertical direction overlaps with a projection of the transmission apparatus 126 in the vertical direction.

(Advantages)

As explained above, in the first embodiment, the cooling-water control valve 10 controls the flow rate of the cooling water for the engine 11 and includes the housing 32 and the valve member 33. The housing 32 has the multiple outlet ports 77, 78 and 79. The valve member 33 is movably provided in the housing 32 so that it is rotatable around the axis line AX. The valve member 33 has the multiple opened portions 87, 88 and 89. Each of the opened portions 87, 88 and 89 is formed at such a position, which is different from one another in the axial direction. Each of the opened portions 87, 88 and 89 is operatively communicated to one of the outlet ports 77, 78 and 79. The valve member 33 changes the communication ratio between each of the opened portions 87, 88 and 89 and each of the outlet ports 77, 78 and 79 depending on the rotational position thereof. The cooling-water control valve 10 is provided in the engine room at the position between the engine 11 and the electric power converting device 127.

Since the cooling-water control valve 10 is provided as above, it is possible to effectively use the narrow space A1 between the engine 11 and the electric power converting device 127. Therefore, it is possible to mount the cooling-water control valve 10 to the engine 11 without making the unit larger, which includes the engine 11 and the peripheral equipment.

In addition, according to the first embodiment, the housing 32 is formed in the cylindrical shape, the radial length of which is made smaller than the axial length. The cooling-water control valve 10 is arranged in such a way that the radial direction coincides with the opposing direction between the engine 11 and the electric power converting device 127.

As a result, it is possible to mount the cooling-water control valve 10 to the engine 11 in the narrow space A1 between the engine 11 and the electric power converting device 127, even when the size of the housing 32 is relatively increased in the axial direction.

Furthermore, in the first embodiment, the engine 11 is arranged in the vehicle in such a way that the driving-shaft direction is parallel to the vehicle-width direction.

In the case of the transverse engine, the engine 11 has more restrictions in connection with the vehicle-width direction when compared with the longitudinally mounted engine. However, when the valve axial direction of the cooling-water control valve 10 is arranged to be perpendicular to the driving-shaft direction, it is possible to mount the cooling-water control valve 10 to the engine 11 even in the narrow space having a small distance between the engine 11 and the electric power converting device 127 in the vehicle-width direction.

In addition, in the first embodiment, the cooling-water control valve 10 is arranged in such a way that the projection of the cooling-water control valve 10 in the vertical direction overlaps with the part of the projection of the transmission apparatus 126 in the vertical direction.

Since the electric power converting device 127 is provided at the position above the transmission apparatus 126 in the vertical direction, only the narrow space A1 remains between the engine 11 and the electric power converting device 127. Even in such a case, it is possible to mount the cooling-water control valve 10 to the engine 11 instead of a thermostat or a coolant pipe, which are conventionally provided for the engine 11.

Furthermore, in the first embodiment, the housing 32 has one inlet port 76 through which the cooling water is supplied from the outside (the engine 11) into the housing 32 and the housing 32 has the multiple outlet ports 77, 78 and 79 through which the cooling water is supplied from the housing 32 to the outside.

The cooling-water control valve 10 of the above structure is effectively arranged at the outlet portion of the water jacket 21 of the engine 11.

Second Embodiment

Figure 11:
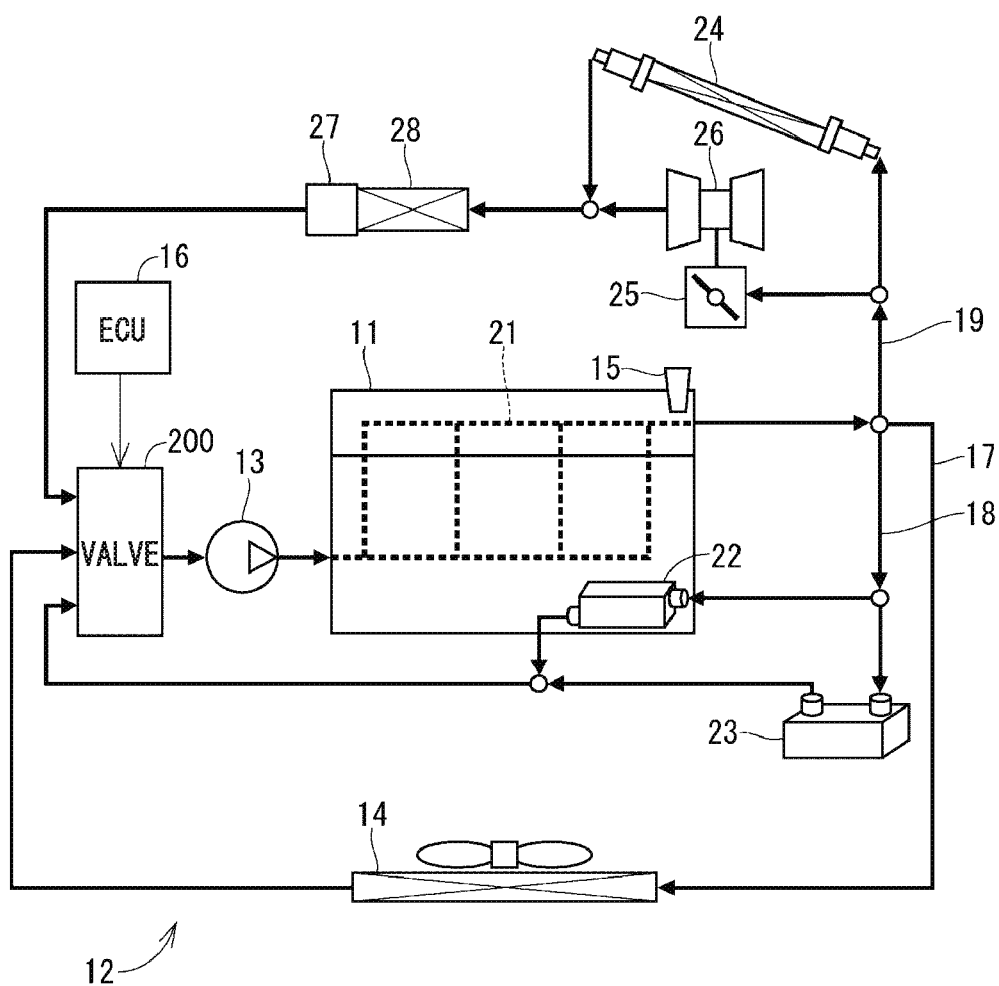
FIG. 11 is a schematic view for explaining the cooling system to which the cooling-water control valve according to a second embodiment is applied, wherein FIG. 11 corresponds to FIG. 1.

As shown in FIG. 11, according to a second embodiment, a cooling-water control valve 200 is provided at a position, at which the circulation passages 17, 18 and 19 get together, for example, at an upstream side of the water pump 13.

Figure 12:
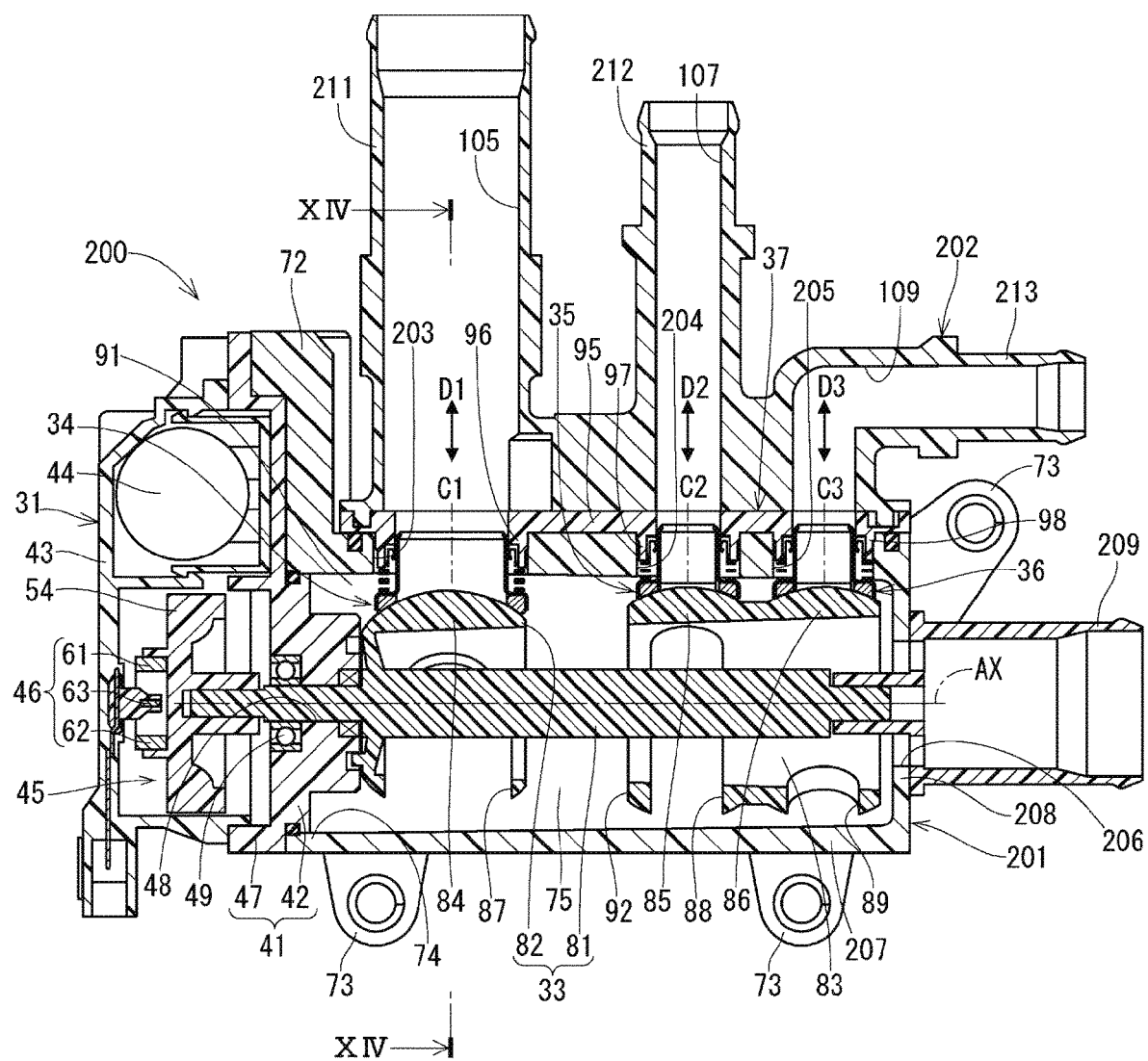
FIG. 12 is a schematic cross-sectional view of the cooling-water control valve of FIG. 11 and showing a condition that the communication ratio between each port of the housing and each opened portion of the valve member is 0%.
Figure 13:
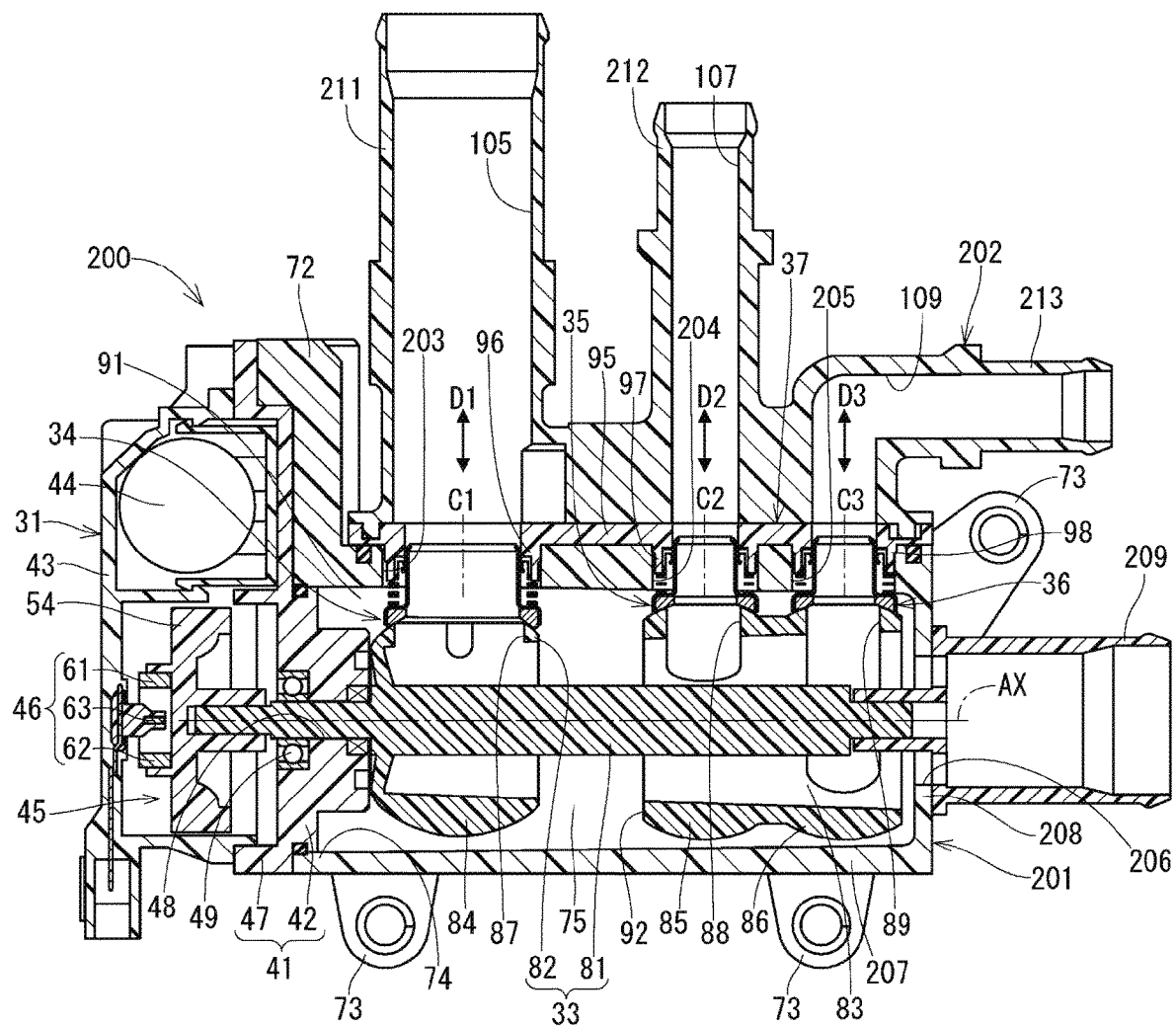
FIG. 13 is a schematic cross-sectional view showing another condition of the valve device that a valve member is rotated from a position of FIG. 12 to a position of FIG. 13, at which the communication ratio between each port of the housing and each opened portion of the valve member becomes 100%.

As shown in FIGS. 12 and 13, the cooling-water control valve 200 includes the driving portion 31, the valve member 33, the sealing units 34, 35 and 36, the holding plate 37 an so on, in the same manner to the cooling-water control valve 10 of the first embodiment. In addition, the cooling-water control valve 200 includes a housing 201 and a pipe member 202 instead of the housing 32 and the pipe member 38 of the first embodiment.

Figure 14:
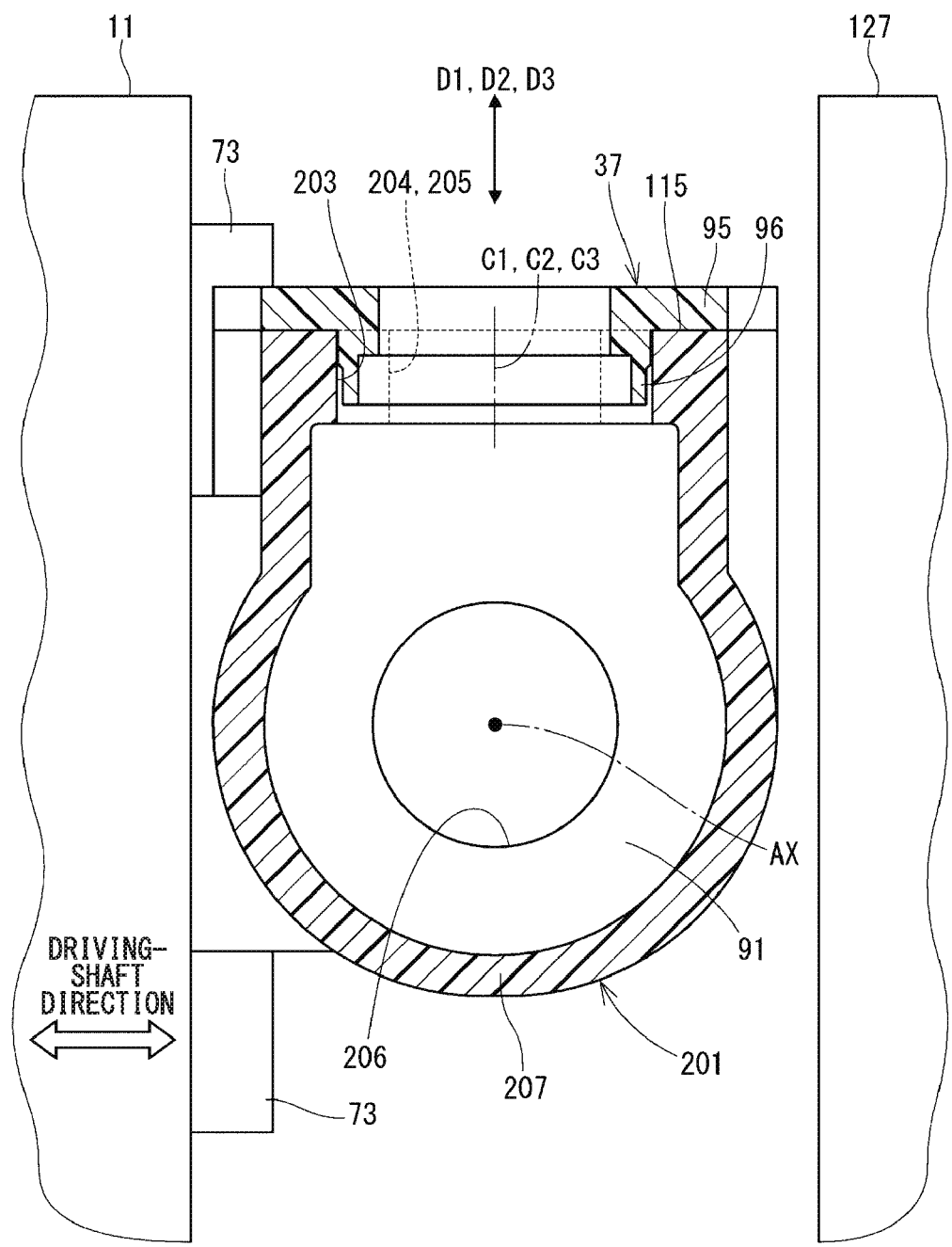
FIG. 14 is a schematic cross-sectional view taken along a line XIV-XIV in FIG. 12 and showing the housing and the holding plate.

The housing 201 has three inlet ports 203, 204 and 205 and one outlet port 206. Each of the inlet ports 203, 204 and 205 is a port through which the cooling water flows into the housing 201. Each of the inlet ports 203, 204 and 205 is a port, a position and a shape of which is the same to each of the outlet ports 77, 78 and 79 of the first embodiment. As shown in FIG. 14, at least a part of each inlet port 203, 204 and 205 overlaps with one another in the circumferential direction of the housing 201, when viewed them in the axial direction (the direction parallel to the axis line AX). In other words, at least a part of one inlet port (for example, the inlet port 203) overlaps with all of the other inlet ports (the inlet ports 204 and 205), when viewed them in the axial direction.

Figure 15:
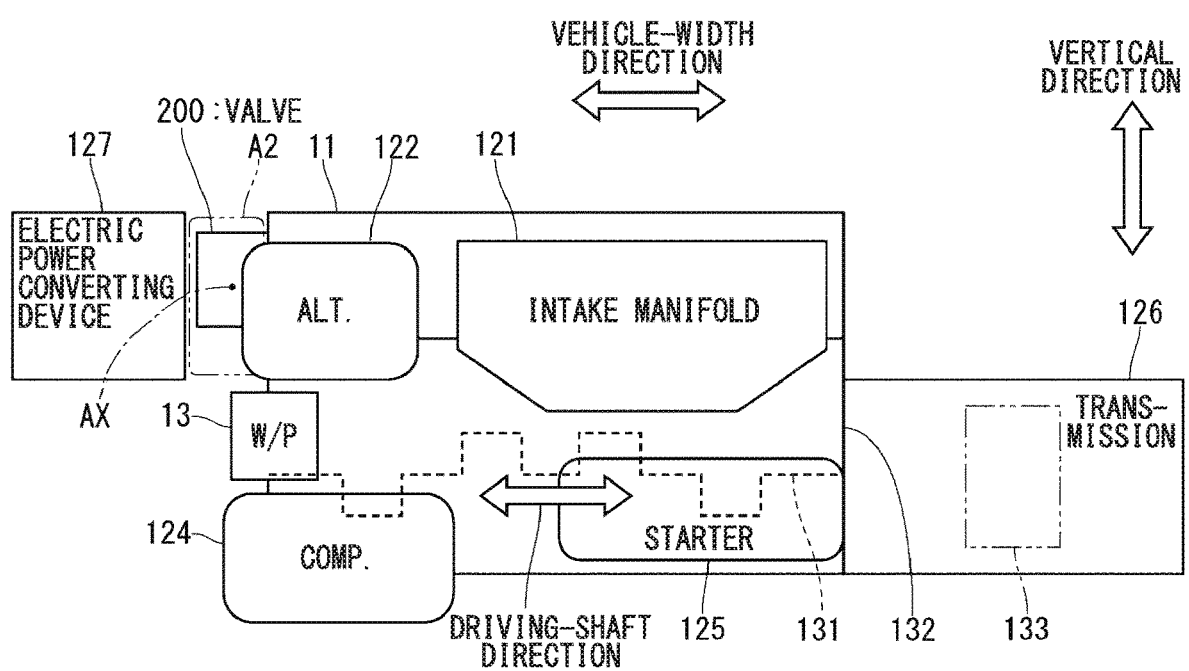
FIG. 15 is a schematic view showing the engine and its peripheral equipment of FIG. 11, when viewed them from the front side of the vehicle.

Accordingly, it is also possible in the second embodiment to make the cooling-water control valve 200 thinner in the opposing direction between the engine 11 and the electric power converting device 127, in the same manner to the first embodiment. As shown in FIG. 15, it is possible to mount the cooling-water control valve 200 to the engine 11 in a narrow space A2, which is a space neighboring to the water pump 13 and which is formed between the engine 11 and the electric power converting device 127 in the vehicle-width direction. The cooling-water control valve 200 is arranged in such a way that the valve axial direction is substantially perpendicular to the driving-shaft direction, so that the cooling-water control valve 200 can be mounted to the engine 11 in the narrow space A2. In addition, the cooling-water control valve 200 is arranged in such a way that the radial direction of the housing 201 coincides with the opposing direction between the engine 11 and the electric power converting device 127.

As shown in FIGS. 12 and 13, the housing 201 has the outlet port 206 at an axial end 208 of a housing main body 207, which is located at a position opposite to the driving portion 31 in the axial direction. The housing 201 further has an outlet pipe portion 209 fixed to the axial end 208. The outlet port 206 is in communication with the inner space 75 independently from the rotational position of the valve member 33. The valve member 33 operatively communicates the outlet port 206 with the inlet ports 203, 204 and 205 or blocks off the communication between them depending on the rotational position of the valve member 33.

As above, a relationship between the one port (the outlet port 206) and the other three ports (the inlet ports 203, 204 and 205) is opposite to that of the first embodiment. It is not necessary in the present embodiment to provide the outlet port 206 in a direction perpendicular to the axial direction of the valve member 33. Therefore, it is possible to freely select a layout of the pipe portion to be connected to the outlet port 206. Flexibility for mounting the cooling-water control valve 200 to the engine 11 can be increased. Since the outlet port 206 is provided at the position of the housing 201, which is located in the axial direction of the valve member 33, it is possible to reduce a number of curved portions for the fluid flow of the cooling water in a passage from the inlet ports 203, 204 and 205 to the outlet port 206. It is, therefore, possible to reduce resistance for the fluid flow.

The pipe member 202 includes pipe portions 211, 212 and 213. As shown in FIG. 12, each of the pipe portions 211, 212 and 213 is formed at a position, which is located on a cross section including the axis line AX and passing through the inlet ports 203, 204 and 205. The pipe member 202 is made smaller than a width of the housing 201. It is, therefore, possible to make the cooling-water control valve 200 thinner.

Further Embodiments and/or Modifications

According to a further embodiment or modification, the cooling system to which the cooling-water control device is applied is not limited to the cooling system shown in FIG. 1 or FIG. 11. It is possible to change the components to be provided in the circulation passages. For example, the electric power converting device and other components may be provided in the circulation passages. The number of the circulation passages may be changed to two or four (or more than four). The number of the ports to be closed depending on the rotational position of the valve member may be correspondingly changed to two or four (or more than four).

In the case that the cooling-water control valve is provided between the engine and the electric power converting device, the cooling-water control valve may be fixed not to the engine but to the electric power converting device.

According to a further embodiment or modification, in the multiple ports to be closed by the valve member depending on its rotational position, at least a part of one port overlaps with one or more than one of the other ports when viewed them in the axial direction. Even in such an arrangement, it is possible to concentrate the multiple ports at the predetermined portion of the housing in the circumferential direction. It is possible to make the cooling-water control valve thinner.

According to a further embodiment or modification, the opening directions of the multiple ports may not be parallel to one another. Even in such a modification, it is possible to assemble the sealing units to the cooling-water control valve without rotating the housing, so long as the multiple ports are collected at the predetermined portion of the housing in the circumferential direction of the housing.

According to a further embodiment or modification, the holding plate and the multiple pipe portions may be integrally formed with one another.

According to a further embodiment or modification, the driving portion may be composed of a driving unit of a different type. Any well-known driving unit, which outputs the rotational driving power, can be used as the driving portion.

According to a further embodiment or modification, the shaft portion and the cylindrical portion of the valve member may be made of different parts from each other. In addition, in the cylindrical portion, the annular convex portions may be made of parts, which are separate from one another.

The present disclosure is explained with reference to the embodiments and modifications. However, the present disclosure is not limited to the structures of those embodiments and/or modifications. The present disclosure may include various kinds of modifications and modified embodiments within a scope of equivalents. In addition, various kinds of the combinations and embodiments as well as the other combination and embodiments in which one or more than one element is added or one or more than one element is eliminated are included within the meaning and the spirit of the present disclosure.

What is claimed is:

1. A valve device for controlling a flow rate of cooling water for an engine of a vehicle comprising:
   a housing having multiple ports; and
   a valve member movably provided in an inner space of the housing so that it is rotatable around an axis line of the valve member,
   the valve member having multiple opened portions, each of which is formed at a position different from one another in an axial direction of the valve member, and each of which is operatively communicated to one of the multiple ports, wherein a communication ratio between each of the multiple opened portions and each of the multiple ports is changed depending on a rotational position of the valve member,
   wherein the valve device is provided at a position between the engine and an electric power converting device, which is used for an electric motor working as a driving power source for the vehicle other than the engine.

2. The valve device according to claim 1, wherein
   the housing is formed in a cylindrical shape, a radial length of which is smaller than an axial length of the housing, and
   the valve device is arranged in such a way that a radial direction of the housing coincides with an opposing direction, in which the engine and the electric power converting device are opposed to each other.

3. The valve device according to claim 1, wherein
   the engine is arranged in such way that a shaft axial direction of a driving shaft of the engine is parallel to a width direction of the vehicle.

4. The valve device according to claim 1, wherein
   the valve device is mounted to the engine or the electric power converting device in such a way that a projection of the valve device in a vertical direction partly overlaps with a projection of a transmission apparatus in the vertical direction, wherein the transmission apparatus is assembled to the engine.

5. The valve device according to claim 1, wherein
   each of the multiple ports is an outlet port for supplying the cooling water from the inner space of the housing to an outside thereof, and
   the housing has an inlet port for supplying the cooling water from the outside of the housing into the inner space of the housing.

6. The valve device according to claim 1, wherein
   each of the multiple ports is an inlet port for supplying the cooling water from an outside of the housing into the inner space of the housing, and
   the housing has an outlet port for supplying the cooling water from the inner space of the housing to the outside thereof.

7. A cooling system comprising;
   an engine; and
   the valve device according to claim 1.

* * * * *